United States Patent [19]

Green

[11] 3,833,278

[45] Sept. 3, 1974

[54] ANTI-FRICTION BEARING IDLER ASSEMBLY

[75] Inventor: Raymond J. Green, Northville, Mich.

[73] Assignee: General Motors Corporation, Detroit, Mich.

[22] Filed: May 21, 1973

[21] Appl. No.: 361,976

[52] U.S. Cl. .............................................. 308/190
[51] Int. Cl. ........................................... F16c 33/00
[58] Field of Search............................ 308/190, 191

[56] References Cited
FOREIGN PATENTS OR APPLICATIONS
885,219   5/1943   France.............................. 308/190

Primary Examiner—Charles J. Myhre
Assistant Examiner—Frank Susko
Attorney, Agent, or Firm—Ronald L. Phillips

[57] ABSTRACT

An idler assembly having a bracket, an idler and an anti-friction bearing with an outer race secured in a tubular portion of the bracket and an inner race secured on a central tubular portion of the idler.

2 Claims, 4 Drawing Figures

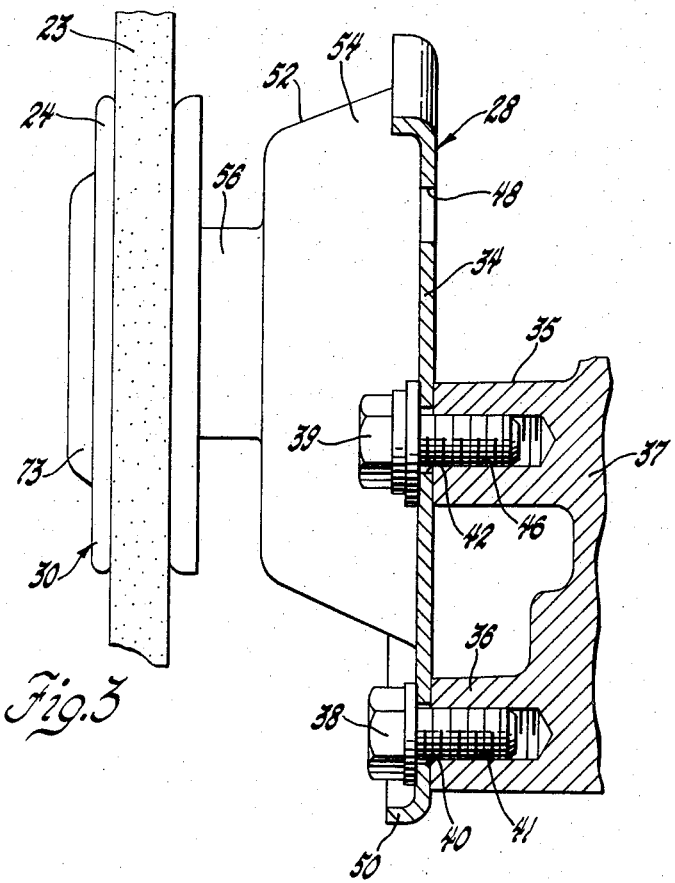
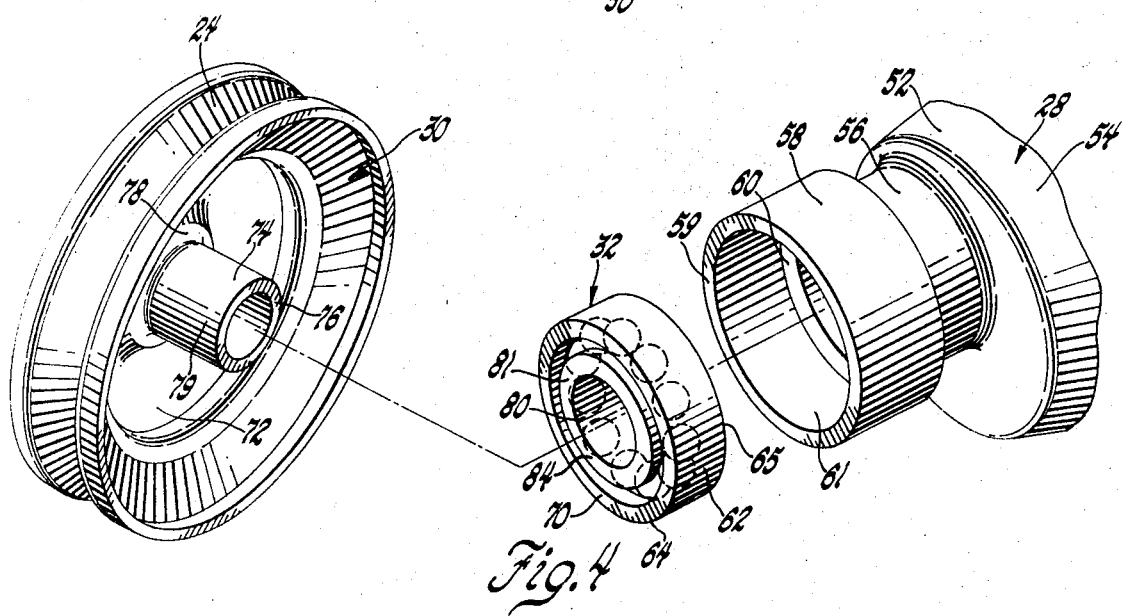

ANTI-FRICTION BEARING IDLER ASSEMBLY

This invention relates to an anti-friction bearing idler assembly and more particularly to an idler assembly having an anti-friction bearing with a stationary outer race and a rotary inner race.

To meet the demand for a mass producible high speed anti-friction bearing idler assembly of simple structure with low unit cost and short assembly time, the idler assembly according to the present invention as applied to an idler pulley arrangement for high speed use on a rotary combustion engine comprises a bracket that is adjustably mounted on the engine and has a tubular portion extending therefrom. The pulley which is the idler in this assembly and experiences high speeds in such usage also has a tubular portion extending centrally therefrom. An anti-friction bearing is located intermediate these tubular portions with its outer race press-fitted in the tubular portion of the bracket whereafter the tubular portion is flanged at its open end to retain the outer race while the inner race of the bearing is press-fitted over the tubular portion of the pulley whereafter the latter tubular portion is flanged at its open end to retain the inner race. Thus, the outer race is held stationary while the pulley is supported by and rotates with the inner race with the result that the relative speed between the races which is a rating factor for bearing usage is desirably reduced as compared with commercial automotive idler pulley assemblies which commonly have a stationary inner race and a rotary outer race. Furthermore, with such an arrangement both the bracket and the idler can be simply formed by stamping from sheet metal with forming of the ends of the tubular portions to retain the bearing's races on these respective members performed in subsequent steps in the proper sequence. This results in a readily mass producible simple assembly of low unit cost that does not require separate fasteners and can be assembled in a short time.

An object of the present invention is to provide a new and improved anti-friction bearing idler assembly.

Another object of the present invention is to provide an idler assembly having a bracket with a tubular portion and also an idler with a tubular portion and an anti-friction bearing which is press-fitted and retained at its outer race on the bracket's tubular portion and at its inner race on the idler's tubular portion.

Another object is to provide an idler assembly having a bracket and an idler and an anti-friction bearing with an outer race secured in a tubular portion on the bracket and an inner race secured on a central tubular portion of the idler with all such securing being effected without separate fasteners.

These and other objects of the present invention will be more apparent from the following description and drawing in which:

FIG. 3 is an enlarged view of the idler assembly taken along the line 3—3 in FIG. 1.

FIG. 4 is an exploded view of the idler assembly at intermediate stages of its assembly.

Figure 1:
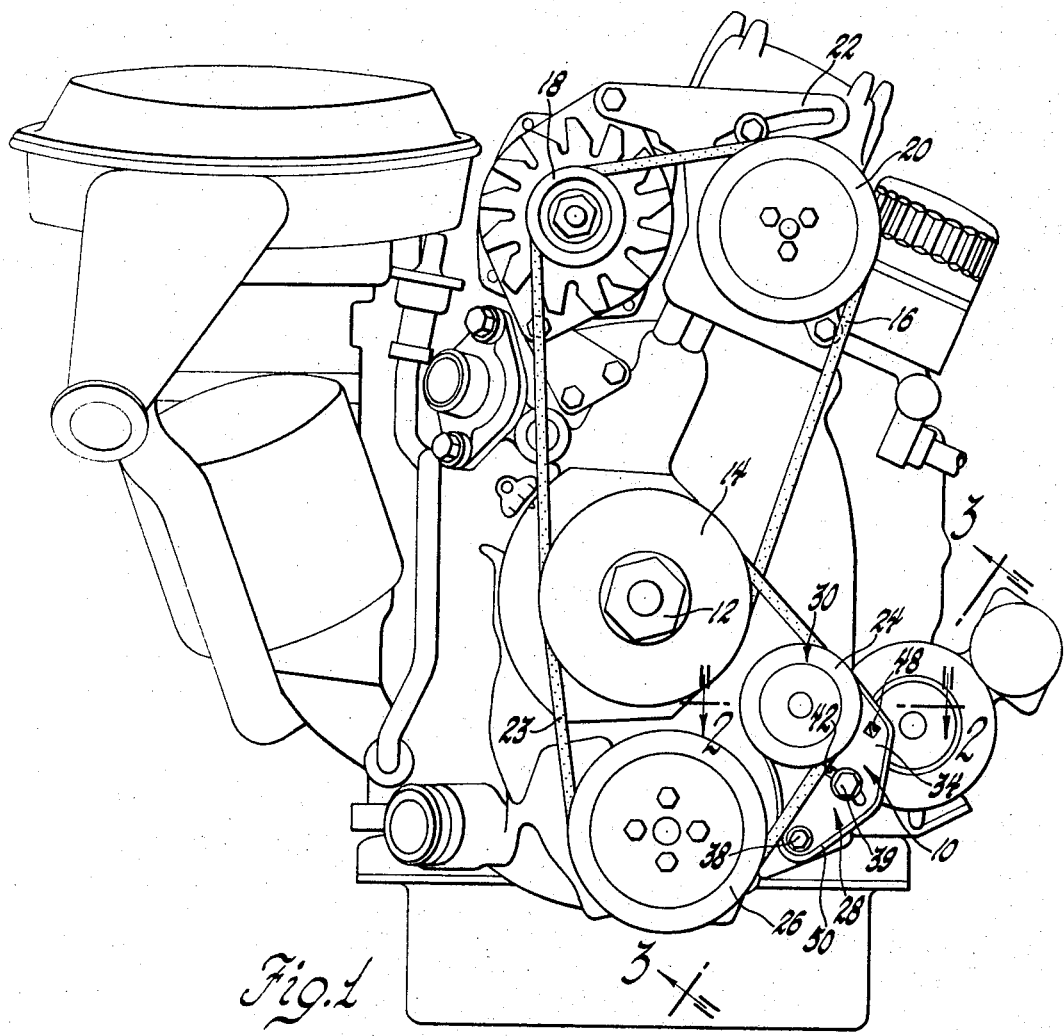
FIG. 1 is a front elevational view of a rotary combustion engine having an anti-friction bearing idler assembly constructed according to the present invention.

Referring to FIG. 1, the anti-friction bearing idler assembly is readily mass producible for usage in the form of an idler pulley arrangement 10 on a rotary combustion engine. Briefly describing the engine's belt-driven components, the engine's crankshaft 12 is connected to drive a double sheave or pulley 14 whose rear pulley engages a belt 16 to drive an alternator's pulley 18 and also an air pump's pulley 20, the latter unit being adjustably mounted on a bracket 22 to provide for proper tensioning of belt 16. The front crankshaft pulley 14 engages and drives a belt 23 that passes over the idler assembly's pulley 24 and drives a water pump's pulley 26, the idler pulley 24 being adjustable as described in more detail later to provide proper tensioning of belt 23.

According to the present invention the idler pulley arrangement 10 comprises only three basic components; namely, an attaching bracket 28, an idler 30 and a permanently lubricated and sealed anti-friction bearing 32 of the ball type. Both the bracket 28 and the idler 30 can be readily mass produced by stamping from sheet metal while the anti-friction bearing 32 is a commercially available unit requiring no modifications for usage in the assembly as will be described in more detail later.

Describing first the details of the bracket 28, this component has a flat base portion 34 whose back side abuts with a pair of bosses 35 and 36 that extend from the engine's front housing 37 as best shown in FIG. 3. The bracket 28 is secured to these housing bosses by a pair of bolts 38 and 39. The bolt 38 extends through an aperture 40 in the base 34 and its thread engages a tapped hole 41 in the lower boss 36. The bracket 28 is pivotal about the axis of bolt 38 to effect proper tensioning of the belt 23 while both bolts are in place but not tightened by being provided with a circular arc slot 42 which receives the other bolt 39 whose threads engage a tapped hole 46 in the upper boss 35, the slot 42 having its center of generation at the center of the bolt hole 40. Clockwise movement of bracket 28 as viewed in FIG. 1 operates to apply more tension to the belt 23 and the positioning thereof to effect the proper tensioning is readily accomplished by a square hole 48 that is pierced in the base 34 at a location radially outward of the slot 42. The hole 48 is sized to receive a conventional socket wrench to accomplish the required pivotal movement of the bracket with a relatively small applied force whereafter the bolts 38 and 39 are properly torqued to firmly hold the bracket in position. The bracket's base 34 has an outwardly facing peripheral flange 50 provided for rigidity and within the flanged area has a tubular portion generally designated as 52 extending as a broad cone section 54 from the base 34 at a location remote from pivot hole 40 and then narrowing at a more remote eccentric location to a neck section 56 and thereafter enlarging to a cylindrical section 58 that terminates with an open end 59 that is formed prior to assembly as shown in FIG. 4. The interior of the tubular portion's cylindrical section 58 has a radially extending annular shoulder 60 and a cylindrical surface 61 that joins with this shoulder at the outer radius thereof and extends outwardly to the open end. The diameter of the inner cylindrical surface 61 is selected to have a press-fitting relationship with the outer cylindrical surface 62 of the bearing's outer race 64 with the axial length of the cylindrical surface 61 being slightly longer than the width of the outer race 64 for reasons which will become apparent later.

Figure 2:
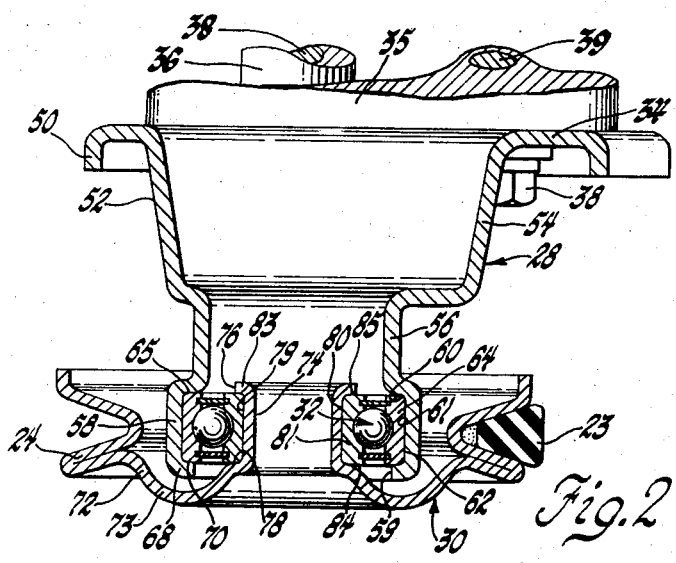
FIG. 2 is an enlarged view of the idler assembly taken along the line 2—2 in FIG. 1.

In the first assembly operation, the bearing 32 is press-fitted into the cylindrical section 58 with its outer race's outer cylindrical surface 62 press-fitted against the cylindrical surface 61 and what becomes its inboard end face 65 abutting the internal shoulder 60. With the bearing 32 thus press-fitted in place, the end 59 of the cylindrical section 58 is bent radially inward over the outer race 64 to form an annular flange or shoulder 68 that abuts with the outboard end face 70 of the outer race 64 whereby the outer race 64 is firmly secured in the tubular portion 52 of bracket 28 as shown in FIG. 2.

Describing now the details of idler 30, there is formed for the particular usage the pulley 24 which joins with a radially extending hub section 72 that has an annular valley 73 from which extends a central tubular portion 74 that terminates with an open end 76 that is formed prior to assembly as shown in FIG. 4. The exterior of the idler's tubular portion 74 has a radially extending annular shoulder 78 and a cylindrical surface 79 which joins with this shoulder at the inner radius thereof and extends axially to the open end 76. The diameter of the cylindrical surface 79 is selected to have a press-fit with the inner cylindrical surface 80 of the bearing's inner race 81 and the axial length of the cylindrical surface 80 is made slightly longer than the width of the inner race 81. The idler's tubular portion 74 is received in the inner race 81 after the bearing 32 has been secured to the bracket 28 as previously described with the external cylindrical surface 79 press-fitted to the inner race's inner cylindrical surface 80 and the outboard end face 84 of the inner race abutting the external shoulder 78. Thereafter the then inboard located open end 76 of the idler's tubular portion 74 is bent radially outward over the inner race 81 as shown in FIG. 2 to provide an annular flange or shoulder 83 that abuts with the inboard end face 85 of the inner race which is thereby firmly secured to the idler. With this arrangement of parts, the last step in assembly which is the forming of flange 83 on the idler's tubular portion 74 is made possible by the tubular portion 52 on the bracket which provides access to this interior location for a suitable flanging tool.

With the idler pulley 24 rotatably mounted on the bracket 28 by the anti-friction bearing 32 whose inner race thus rotates and outer race is thus stationary, the relative speed between these bearing members is less than if the outer race rotated and the inner race was stationary for the same idler speed. As a result, the useful speed of the anti-friction bearing 32 and thus of the idler pulley 24 is effectively extended beyond that of automotive idler pulleys having a stationary inner race and a rotary outer race. Furthermore, by the provision of the valley 73 in the hub 72, the pulley 24 is located directly radially outward of the bearing 32 so that the bearing is subjected to only radial loading and experiences no force couple. This enhances the life of the bearing and also results in a very compact assembly characterized by its short overall axial length.

It should also be apparent that with both the bracket and the idler made with stampings of sheet metal to their relative simple configurations, their manufacture is ideally suited for mass production. It should also be apparent that while in the preferred embodiment the open ends of the tubular portions on the bracket and idler are finally formed with flanges for retention of the bearing, these ends may be formed or shaped otherwise to provide such retention. For example, there may be formed angularly spaced tabs rather than a complete annular flange or the open ends of the tubular portions may be staked against the bearing at angularly spaced locations to provide sufficient retention.

The above described embodiments are illustrative of the invention which may be modified within the scope of the appended claims.

I claim:

1. An anti-friction bearing idler assembly comprising an attaching bracket of substantially constant wall thickness having a base portion and a tubular portion extending therefrom terminating with an open end, the interior of said bracket's tubular portion having a first radially extending annular shoulder and a cylindrical surface joining with this shoulder at the outer radius thereof and extending to the open end of said bracket's tubular portion, an idler of substantially constant wall thickness having a centrally located tubular portion terminating with an open end, the exterior of said idler's tubular portion having a first radially extending annular shoulder and a cylindrical surface joining with this shoulder at the inner radius thereof and extending to the open end of said idler's tubular portion, an anti-friction bearing comprising an inner race and an outer race and a plurality of anti-friction elements operably arranged therebetween, said outer race having an outer cylindrical surface and axially spaced oppositely facing end faces, said inner race having an inner cylindrical surface and axially spaced oppositely facing end faces, said outer race arranged in said bracket's tubular portion with said outer cylindrical surface press-fitted to said bracket's cylindrical surface and one end face thereof abutting said bracket's first shoulder, said bracket's tubular portion further having a second radially extending annular shoulder at the open end thereof formed to abut the other end of said outer race with said anti-friction bearing in place whereby said outer race is firmly secured to said bracket, said inner race arranged around said idler's tubular portion with said inner cylindrical surface pressfitted to said idler's cylindrical surface and one end face thereof abutting said idler's first shoulder, and said idler's tubular portion further having a second radially extending annular shoulder at the open end thereof formed to abut the other end face of said inner race with said anti-friction bearing in place and already secured to said bracket whereby said idler is firmly secured to said inner race and rotatably relative to said bracket on said anti-friction bearing.

2. An anti-friction bearing idler pulley assembly comprising an attaching bracket of sheet metal having a base portion and a tubular portion extending therefrom terminating with an open end, the interior of said bracket's tubular portion having a first radially extending annular shoulder and a cylindrical surface joining with this shoulder at the outer radius thereof and extending to the open end of said bracket's tubular portion, an idler pulley of sheet metal having a centrally located tubular portion terminating with an open end, the exterior of said idler pulley's tubular portion having a first radially extending annular shoulder and a cylindrical surface joining with this shoulder at the inner radius thereof and extending to the open end of said idler pulley's tubular portion, an anti-friction bearing comprising an inner race and an outer race and a plurality of anti-friction elements operably arranged therebetween, said outer race having an outer cylindrical surface and axially spaced oppositely facing end faces, said inner race having an inner cylindrical surface and axially spaced oppositely facing end faces, said outer race arranged in said bracket's tubular portion with said outer cylindrical surface press-fitted to said bracket's cylindrical surface and one end face thereof abutting said bracket's first shoulder, said bracket's tubular portion further having a radially inwardly extending annular flange formed to provide a second radially extending annular shoulder at the open end thereof abutting the other end of said outer race with said anti-friction bearing in place whereby said outer race is firmly secured to said bracket, said inner race arranged around said idler pulley's tubular portion with said inner cylindrical surface press-fitted to said idler pulley's cylindrical surface and one end face thereof abutting said idler's first shoulder, and said idler pulley's tubular portion further having a radially outwardly extending annular flange formed to provide a second radially extending annular shoulder at the open end thereof abutting the other end face of said inner race with said anti-friction bearing in place and already secured to said bracket whereby said idler pulley is firmly secured to said inner race and rotatable relative to said bracket on said anti-friction bearing.

* * * * *